United States Patent [19]

Sharp

[11] Patent Number: 4,549,791
[45] Date of Patent: Oct. 29, 1985

[54] REAR VIEW MIRROR WITH REINFORCED EAR MEMBER

[75] Inventor: Bernard C. Sharp, White Plains, N.Y.

[73] Assignee: Parker-Hannifin Corporation, Shelton, Conn.

[21] Appl. No.: 528,471

[22] Filed: Sep. 1, 1983

[51] Int. Cl.[4] ............................ G02B 5/08; B60R 1/00
[52] U.S. Cl. .................................... 350/632; 248/474; 248/549
[58] Field of Search ............... 350/288, 307, 302, 303, 350/632; 428/626, 409; 248/466, 468, 470, 474–479, 489, 496, 497, 549

[56] References Cited

U.S. PATENT DOCUMENTS

| | | | |
|---|---|---|---|
| 2,719,327 | 10/1955 | Pique | 350/293 |
| 3,876,175 | 4/1975 | Roberts | 248/475.1 X |
| 4,135,788 | 1/1979 | Sargis | 350/307 |
| 4,172,929 | 10/1979 | Cooper et al. | 428/409 X |
| 4,311,363 | 1/1982 | Marsalka et al. | 350/299 |
| 4,368,868 | 1/1983 | Urban | 248/479 X |
| 4,429,020 | 1/1984 | Lunch | 428/626 X |
| 4,447,130 | 5/1984 | Christiansen et al. | 350/310 |

FOREIGN PATENT DOCUMENTS 1282097 12/1962 France ................................ 248/477

Primary Examiner—John K. Corbin
Assistant Examiner—David Lewis
Attorney, Agent, or Firm—Albert C. Johnston

[57] ABSTRACT

A rear view mirror head for vehicles, especially automotive vehicles such as small trucks, comprises a mirror head body constituted by a unitary, resilient dish-shaped molding of a tough, weather-resistant organic polymer composition, preferably an ABS resin, which presents about its front side peripheral formations for supporting a reflecting mirror plate with an edge gasket of the plate adhered thereto and comprises a backwardly hollowed narrow ear-shaped portion the hollow of which opens to the front side of the molding and has fitted into it rigid ear-reinforcing arms of angled brackets of which rigid base portions extend over and are fixed to areas of the front side adjacent to the hollowed portion of the molding. The resin of the molding can be of an electroplatable type having a stiffening decorative metal coating plated onto at least the outside surfaces. The construction obviates unsightly corrosion and difficulties of mirror plate mounting experienced with previous mirror heads of similar type, while providing the required strength and security of mounting of the mirror head in viewing position on a vehicle.

12 Claims, 2 Drawing Figures

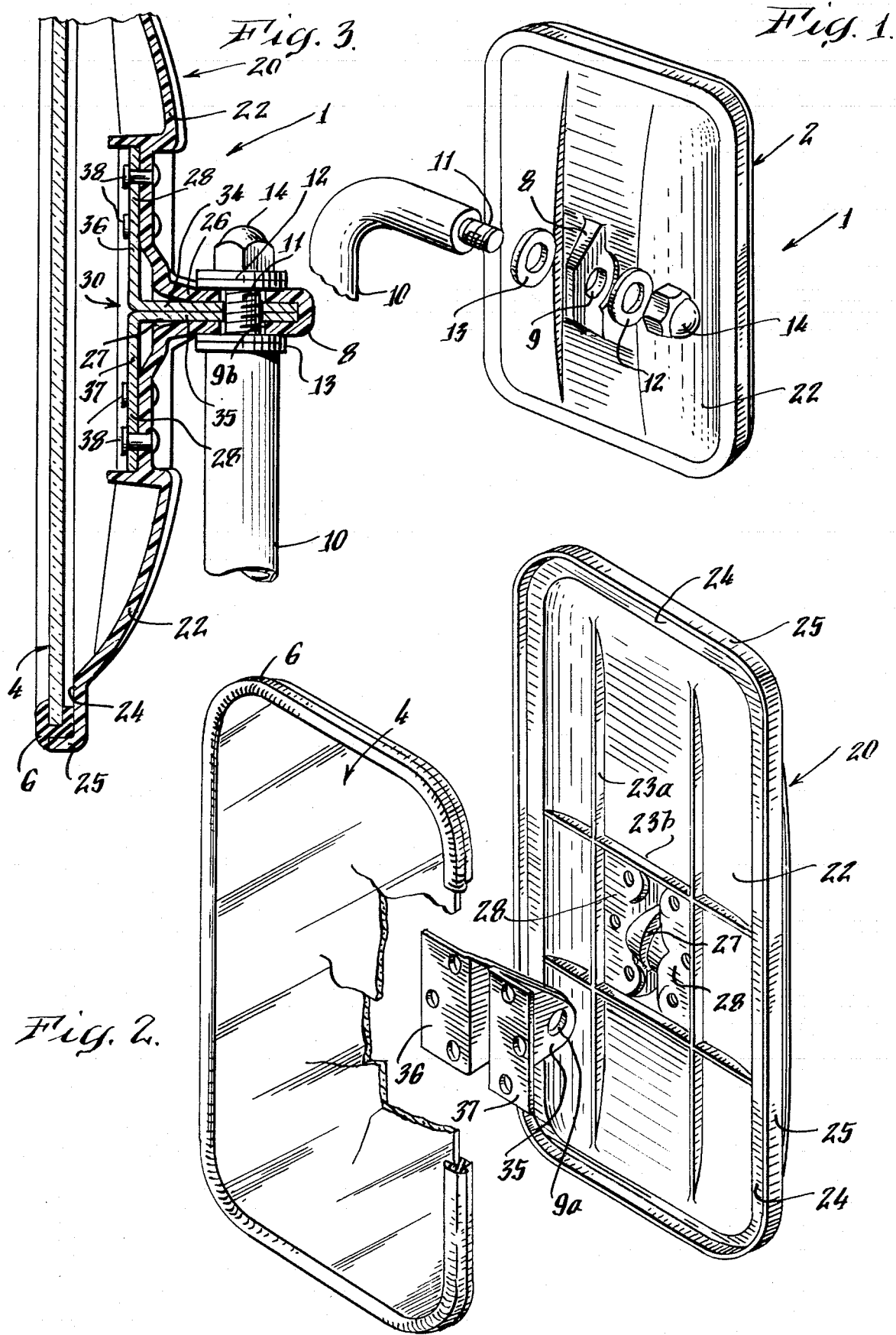

REAR VIEW MIRROR WITH REINFORCED EAR MEMBER

This invention relates to a construction of a mirror head for a rear view mirror of a type used on automotive vehicles and, more particularly, on vehicles, sometimes referred to as "small trucks", such as pick-up trucks, vans, campers, or similar recreational or utility vehicles.

A well known rear view mirror of the type mentioned has its mirror head provided as dish-shaped body of sheet steel presenting about its front side peripheral formations which support a reflecting mirror plate, and having on its back side a backwardly protruding ear member formed to be clamped to a support arm, such as an end portion of a "goose-neck" arm of a tripod mounting bracket, for holding the mirror in viewing position on a vehicle body. The dish-shaped sheet metal head body as the ear member fixed to an area of its back side, the ear member being constituted by a pair of angled steel brackets which have protruding ear portions arranged back to back against each other and have oppositely directed base portions bearing against and fixed by rivets to a central area of the head body. At least the exposed, or outside, surfaces of the dish-shaped sheet metal body with the ear member fixed to it are chromium plated or painted to enhance the appearance of the mirror and its resistance to corrosive influences of weather or other use conditions.

The known mirror head construction mentioned above has presented problems in use, as the structure is susceptible to corrosion particularly at or about the ear forming brackets fixed to the steel body and thus to becoming unsightly and weakened objectionably. Also, the mirror head may vibrate excessively in use. Another shortcoming is that problems have existed in fastening the reflecting mirror plate onto the peripheral formations about the front side of the sheet steel body. In the current practice of crimping a flange of the peripheral body formations onto a gasket fitted about the edge of the mirror plate, the flange sometimes is crimped insufficiently with resulting loss of the plate from the head in the use of the mirror.

The principal object of the present invention is to provide an improved rear view mirror head construction of the type mentioned, by which the problems of excessive head vibration and of corrosion at exposed areas of the head can be obviated, also the problem of fixing and keeping a mirror plate in place on a dish-shaped head body, while still providing at low cost the strength, durability and reliability required for a rear view mirror suited for use on vehicles such as small trucks.

In accordance with this invention, a rear view mirror including a mirror head in the form of a dish-shaped body of sheetlike material presenting about its front side peripheral formations to support a reflecting mirror plate is provided as a unitary, resilient dish-shaped molding of a tough, weather-resistant organic polymer composition; and a backwardly protruding ear member, clampable to a support arm for holding the mirror in viewing position on a vehicle, is provided on the dish-shaped body by a backwardly hollowed ear-shaped portion of the molding, the hollow of which opens to the front side of the molding and has fitted into it a rigid ear-reinforcing arm. This arm is a projecting portion of rigid reinforcing means which also comprise at least one angled rigid base portion extending over and fixed to an area of the front side of the molding adjacent to the hollowed portion.

A mirror head so constructed has all its exposed, or outside, surfaces formed by the organic polymer composition, so is not susceptible to being rendered unsightly by corrosion; yet the strength and stability required in the head body, and particularly in its backwardly protruding ear member, to enable secure clamping of the ear member to a support arm with secure holding of the mirror in viewing position on a vehicle is provided by the reinforcing action of the rigid arm fitted into the hollow of the ear member and the angled rigid base portion extending over and fixed to an area of the front side of the molding adjacent to the hollowed portion. As a further advantage of the construction, the reflecting plate forming the front of the mirror can be securely fixed and sealed in place by means of an adhesive suitably selected for joining a gasket fitted about the plate edge onto peripheral surfaces of the molding, without need for any forcible crimping operation.

The above mentioned and other objects, features and advantages of the invention will be further apparent from the following detailed description and the accompanying drawings of an illustrative embodiment of the invention. In the drawings:

FIG. 1 is rear elevational perspective view of a rear view mirror head body constructed according to the invention and some parts of a conventional support arm onto which the ear member of the body is clampable for mounting the mirror in viewing position on a vehicle;

FIG. 2 is an exploded perspective view of components of the mirror head, showing the front side of the head body, the reinforcing bracket means and the gasket-protected reflecting glass plate; and FIG. 3 is a substantially horizontal cross sectional view showing the mirror head with its ear member clamped to the support arm.

The rear view mirror 1 in the illustrated embodiment of the invention is composed of a plate supporting body, or housing, 2 and a reflecting mirror plate 4. The plate 4 preferably is a glass plate silvered over its back side and protected about its edge by an elastic gasket 6 of rubber or rubber-like material fitted onto the edge.

The mirror head body 2 is made with a backwardly protruding ear member 8 shaped for being clamped to a support arm, such as a "gooseneck" arm 10 of a conventional tripod mirror mounting device (not shown), for holding the mirror in viewing position on a vehicle. The viewing position in the case of vehicles such as small trucks is considerably outboard of the body or cab of the vehicle; so a mirror head body 2 supporting a reflecting mirror plate of considerable surface area, having for instance a width of about 7 inches or more and a height (length) of about 10 inches or more, is provided for such use.

The mirror head body 2 is constituted essentially by a unitary, resilient dish-shaped molding 20 of a tough weather-resistant organic polymer composition. Molding 20 is produced, for example, by injection molding of an acrylonitrile-butadiene-styrene (ABS) resin which may be of a type pigmented to a desired color, such for example as the ABS resin identified as CYCOLAC T, or, preferably, is of an electroplatable type such for example as the ABS resin identified as CYCOLAC EPB 3570, or KRALASTIC MPA 2615. In the case of platable resin, after the body of the mirror head is molded, the molding is subjected to plating processes which provide it with a stiffening and decorative metal coating over its entire surface or, at the least, over its exposed outside surface areas. For instance, after suitable preparation of the surface of the molding, a base coating of so-called "mechanical nickel" may be precipitated onto it from a solution, and then successive coatings respectively of copper and nickel, and finally a chromium layer, may be plated onto the molding by electrolysis.

As may be seen in the drawings, the molding 20 is a dish-shaped body, typically having a generally rectangular shape with rounded corners, which comprises a sheet-like body wall 22 and presents about its front side peripheral surface formations including a continuous ledge 24 surrounded by a rim 25. These formations support the reflecting mirror plate 4 with its edge protecting gasket 6 seated on and adhered by adhesive to the ledge 24 and the rim 25.

In a central region of the molding 20 as considered in the horizontal or transverse direction, the body wall 22 is molded with a backwardly hollowed narrow ear-shaped portion 26 which forms the bounding and external part of the backwardly protruding ear member 8.

The hollowed wall portion 26 bounds an ear-shaped narrow cavity or hollow 27 that opens to the front side of the molding as seen in FIG. 2. This hollow 27 has fitted into it a rigid ear-reinforcing arm or projection of rigid angled reinforcing bracket means 30. The bracket means 30 may have other forms, but in the form shown in constituted by two rigid steel angle brackets which have respective arm portions 34 and 35 placed back to back to form the ear-reinforcing projection and have respective angled base portions 36 and 37 extending over and fixed to an area 28 of the front side of the molding adjacent to the hollow 27. The base portions 36 and 37 are shown fixed to area 28 of wall 22, for example, by several rivets 38 for each bracket piece.

Thus, a backwardly protruding ear member 8 is provided which, although shaped and bounded externally by hollowed portion 26 of the molded wall 22 of tough, weather-resistant polymer composition, is reinforced internally and kept rigid, so as to hold the mirror head securely in viewing position when mounted on a vehicle, by the steel arm projection 34, 35 of the bracket means 30 and the rigidity of the bracket base portions 36 and 37 fixed to front side area 28 of the molding.

In the regions of its front side disposed about the bracketed area 28, the molding 20 comprises integral reinforcing ribs 23a and 23b which protrude forwardly and extend along the dished area of the front side, one rib transverse to another, so as to provide additional strength in the mirror head.

The assembled rear view mirror head, as indicated in FIGS. 1 and 3, can be mounted securely in viewing position on a vehicle simply by clamping the ear member 8 onto a suitable support arm of a mirror mounting bracket, such as a "gooseneck" arm 10. For this purpose, for example, the ear member 8 is formed with an opening 9 extending transversely through both its backwardly hollowed molded portion 26 and its inner, rigid reinforcing projection, so that member 8 can be fitted onto a threaded end portion 11 of the support arm 10 and then can be clamped onto the arm between washers 12 and 13 by tightening a screw 14 threaded onto end portion 11. Parts 9a of the opening 9 are preformed in the bracket arms 34 and 35. Parts 9b of the opening may be molded in the narrow hollowed portion 26 of the molding 20.

A mirror head having a body molding of the construction herein set forth, when made of the platable resin mentioned above and suitably chromium plated, will readily withstand tests for resistance to extreme weather conditions, such as repetitive cycles of heating in an oven at 150° F. and chilling in a freezer at −20° F., without showing any blistering or de-lamination of the plating.

A mirror head construction as herein set forth withstands standard SAE mirror vibration tests, without failing structurally, at least as well as the above mentioned known construction of the same type. The present construction also has important advantages over the known one in that the mirror head vibrates much less under strenuous use conditions; and no unsightly corrosion of the head can occur in its use; and with proper selection of an adhesive for holding and sealing the mirror plate in place no problem of loss of the mirror plate from a head in use is to be expected.

I claim:

1. In a rear view mirror for vehicles, including a dish-shaped body of sheet-like material presenting about its front side peripheral formations to support a reflecting mirror plate and having thereon a backwardly protruding ear member clampable to a support arm for holding the mirror in viewing position on a vehicle, the improvement wherein said body is a unitary, resilient dish-shaped molding of a tough, weather-resistant organic polymer composition and said ear member is constituted by a backwardly protruded hollowed portion of said molding the hollow of which is closed at the backward end of said portion and opens to the front side of said molding and has fitted thereinto a rigid ear-reinforcing means which comprises at least one angled rigid metal bracket, each said bracket having an arm portion thereof extending inside said hollow and having a base portion thereof extending over and seated against an area of said front side adjacent to said hollowed portion.

2. A rear view mirror according to claim 1, said molding comprising integral reinforcing ribs protruding forwardly from said front side and extending therealong, each rib transverse to another, in the regions of the molding inside said peripheral formations and about the area occupied by said reinforcing means.

3. A rear view mirror according to claim 1 or 2, said molding being composed essentially of an acrylonitrile-butadiene-styrene resin.

4. A rear view mirror according to claim 1 or 2, said body being a molding of an electroplatable acrylonitrile-butadiene-styrene resin having a stiffening and decorative metal coating plated onto at least its outside surfaces.

5. A rear view mirror according to claim 4, said coating being formed of successive plated layers respectively of nickel, copper, nickel, and chromium.

6. A rear view mirror according to claim 1 or 2, said reinforcing means comprising a pair of said angled rigid metal brackets the respective arm portions of which bear back to back against each other and are fitted into said hollow and the respective base portions of which extend oppositely over and are fixed to respective areas of said front side at opposite sides of said hollowed portion.

7. A rear view mirror according to claim 1 or 2, said backwardly protruding portion and each said arm portion being formed with an opening extending laterally therethrough, and said openings being aligned to receive through said ear member an end portion of a support arm for mounting the mirror for use.

8. A rear view mirror for vehicles, comprising a unitary, resilient dish-shaped sheet-like molding composed of a tough weather-resistant resin, said molding presenting about its front side peripheral rim surfaces for supporting a reflecting mirror plate with a gasket about the edge of the plate adhered to said surfaces by adhesive, said molding comprising a central, integral, backwardly protruding hollow narrow portion thereof forming an ear member and the hollow of which is closed at the backward end of said portion and opens to said front side and has fitted thereinto a rigid ear-reinforcing means which comprises at least one rigid angled metal bracket having an arm portion thereof extending inside said hollow and having a base portion thereof extending at an angle to said arm portion over and fixed to an area of said front side adjacent to said backwardly protruding portion, whereby said ear member is clampable and will be held secure on a support arm for holding the mirror in viewing postition on a vehicle.

9. A rear view mirror according to claim 8, said molding comprising integral reinforcing ribs protruding forwardly at said front side and extending therealong one transverse to another in the regions of said molding about the area occupied by said base portion.

10. A rear view mirror according to claim 8, said reinforcing means comprising a pair of said rigid angled metal brackets the respective arm portions of which bear back to back against each other and are fitted into said hollow and the respective base portions of which extend oppositely over and are fixed to respective areas of said front side at opposite sides of said backwardly protruded portion.

11. A rear view mirror according to claim 8 or 10, said molding being composed of electroplatable resin and having plated onto at least its outside surfaces a decorative metal coating formed of successively applied platings respectively of nickel, copper, nickel, and chromium.

12. A rear view mirror according to claim 8 or 10, said backwardly protruding portion of said molding and said arm portion of each said bracket having an opening extending laterally therethrough and said openings being aligned to receive through them an end portion of a said support arm.

* * * * *